(12) United States Patent
Takahashi et al.

(10) Patent No.: US 7,491,349 B2
(45) Date of Patent: *Feb. 17, 2009

(54) BLACK TITANIUM OXYNITRIDE

(75) Inventors: Hideo Takahashi, Yokkaichi (JP); Kaoru Isobe, Yokkaichi (JP); Katsuichi Chiba, Yokkaichi (JP); Yuichi Yasuda, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/794,269

(22) PCT Filed: Dec. 27, 2005

(86) PCT No.: PCT/JP2005/023888

§ 371 (c)(1),
(2), (4) Date: Jun. 27, 2007

(87) PCT Pub. No.: WO2006/070795

PCT Pub. Date: Jul. 6, 2006

(65) Prior Publication Data

US 2008/0017835 A1    Jan. 24, 2008

(30) Foreign Application Priority Data

Dec. 28, 2004   (JP) ............................. 2004-381129

(51) Int. Cl.
*H01B 1/06*    (2006.01)

(52) U.S. Cl. .................. 252/520.22; 423/598; 423/608

(58) Field of Classification Search ............ 252/520.22; 423/608, 598; 502/200, 350; 106/436; 427/58
See application file for complete search history.

(56) References Cited

U.S. PATENT DOCUMENTS 4,125,412 A    11/1978   West (Continued)

FOREIGN PATENT DOCUMENTS

JP    53-33228 A    3/1978

(Continued)

OTHER PUBLICATIONS

Yang et al "Optical properties of titanium oxynitride nanocrystals . . . ", Chemical Physics Letters 383 (2004) 502-506.*

*Primary Examiner*—Mark Kopec
(74) *Attorney, Agent, or Firm*—Paul E. White; Manelli Denison & Selter PLLC

(57) ABSTRACT

Disclosed is a titanium oxynitride with excellent hiding properties (light-blocking properties) which is also excellent in degree of blackness and oxidation stability. Specifically disclosed is a titanium oxynitride having a chemical composition expresses as TiNxOy.nSiO$_2$ (wherein Ti represents titanium atoms; N represents nitrogen atoms; O represents oxygen atoms; Si represents silicon atoms; x represents the ratio of nitrogen atoms relative to titanium atoms, y represents the ratio of oxygen atoms relative to titanium atoms, and x and y are respectively a real number of more than 0 but less than 2; and n represents the molar ratio of SiO$_2$ relative to TiNxOy which is a real number within a range of $0 \leq n \leq 0.05$). This titanium oxynitride contains nitrogen atoms represented by N in an amount of not less than 17% by weight but less than 23% by weight, while having a specific surface area of 5-30 m$^2$/g and a crystallite size determined by using an X-ray diffractometer of 17-25 nm.

7 Claims, 3 Drawing Sheets

U.S. PATENT DOCUMENTS

| | | | |
|---|---|---|---|
| 5,002,646 A | * | 3/1991 | Egerton et al. ............... 204/177 |
| 7,071,139 B2 | | 7/2006 | Gole |
| 2002/0169076 A1 | * | 11/2002 | Takeshi et al. ............... 502/350 |
| 2004/0058149 A1 | * | 3/2004 | Zhou et al. ................... 428/328 |

FOREIGN PATENT DOCUMENTS

| | | | |
|---|---|---|---|
| JP | 64-37408 A | | 2/1989 |
| JP | 2-22110 A | | 1/1990 |
| JP | 3-51645 B2 | | 8/1991 |
| JP | 4-195125 A | | 7/1992 |
| JP | 7-8971 A | | 1/1995 |
| JP | 8-59240 A | | 3/1996 |
| JP | 2006-182627 | * | 7/2006 |
| WO | WO 2006/070794 A1 | | 7/2006 |

* cited by examiner

BLACK TITANIUM OXYNITRIDE

TECHNICAL FIELD

The present invention relates to a black titanium oxynitride.

BACKGROUND ART

Titanium oxynitride is a compound which is mainly composed of titanium-oxygen-nitrogen and is generally represented by $TiN_xO_y$ and which is called titanium black. Since titanium oxynitride has blackish color and conductivity, it is added to resins, paints, inks, cosmetics, etc. as a black pigment, and contained in films, fibers, toners, magnetic recording media, etc. as a conductivity-imparting agent. As such a titanium oxynitride, for example, Patent Document 1 discloses a black titanium oxynitride pigment powder containing 4-30% by weight of oxygen and 5-20% by weight of nitrogen (O/N weight ratio: 6-0.2) and having a value L of 14-8 which is obtained by heating titanium dioxide powder at a temperature of 550-950° C. under flowing of ammonia gas.

On the other hand, there is further known titanium nitride mainly composed of titanium-nitrogen and generally represented by TiN as a titanium compound used as a black pigment, and, for example, Patent Document 2 discloses a black titanium nitride powder mainly composed of TiN and containing 1-4% by weight of oxygen and 20-30% by weight of nitrogen, which is obtained by reacting titanium tetrachloride gas and ammonia gas at a temperature of 700-1500° C. to prepare a TiN powder and then oxidizing the surface layer of the powder to titanium oxynitride by flowing a nitrogen-oxygen mixed gas.

Patent Document 1: JP-B-3-51645
Patent Document 2: JP-A-64-37408

DISCLOSURE OF INVENTION

Problem to be Solved by the Invention

For using titanium oxynitride or titanium nitride as a black pigment, improvements depending on the uses are demanded in pigment characteristics such as degree of blackness, coloring power, hiding properties (light-blocking properties), light resistance, endurance and dispersibility. Particularly, for titanium oxynitride when added to black matrixes of color filters used in plasma display panels or color liquid crystal display devices, further improvement has been demanded in hiding properties (light-blocking properties) because commercially available titanium black cannot give desired hiding properties (light-blocking properties). However, Patent Document 1 discloses that when the reaction temperature exceeds 950° C., the powder is extremely sintered, resulting in coarse particles to cause deterioration of pigment characteristics, and thus even when the reaction temperature is further raised, further improvement of pigment characteristics can hardly be attained.

For titanium nitride, although the surface layer part of the TiN powder is partially oxidized to form titanium oxynitride as disclosed in Patent Document 2, there is a problem that oxidation in the air gradually proceeds and hence the pigment characteristics are not stabilized.

Means for Solving the Problem

As a result of an intensive research conducted by the inventors in an attempt to solve the above problems, it has been found that when content of nitrogen in a titanium oxynitride produced by reacting titanium dioxide or the like with ammonia gas or the like is increased to not less than 17% by weight and less than 23% by weight and furthermore the size of crystallites constituting the titanium oxynitride particles is decreased to a range of 17-25 nm, the titanium oxynitride has excellent hiding properties (light-blocking properties) utilizing the reflection of visible light due to the high nitriding degree in addition to the absorption of visible light by black color due to the size effect, and moreover the titanium oxynitride has pigment characteristics such as blackness, especially, oxidation stability. Thus, the present invention has been accomplished.

That is, the present invention relates to a black titanium oxynitride which has a chemical composition represented by the formula: $TiN_xO_y \cdot nSiO_2$ (wherein Ti represents titanium atom, N represents nitrogen atom, O represents oxygen atom, Si represents silicon atom, x represents a ratio of nitrogen atom to titanium atom, y represents a ratio of oxygen atom to titanium atom, x and y can respectively be a real number of more than 0 and less than 2, and n represents a molar ratio of $SiO_2$ to $TiN_xO_y$, and can be a real number in the range of $0 \leq n \leq 0.05$), contains nitrogen atom represented by N in an amount of not less than 17% by weight and less than 23% by weight, and has a crystallite diameter of 17-25 nm determined by using an X-ray diffractometer.

Advantages of the Invention

The titanium oxynitride of the present invention has excellent hiding properties (light-blocking properties) and pigment characteristics such as blackness and oxidation stability, and is used for various uses as a black pigment. Particularly, the titanium oxynitride is used as a black pigment to be contained in black matrixes of color filters used in plasma display panels and color liquid crystal display devices, and furthermore can also be used in optical parts which block visible light, such as glasses, lenses and films. Moreover, since the titanium oxynitride of the present invention is high in nitriding degree and hence has excellent conductivity, it can also be used as a conductivity-imparting agent.

BEST MODE FOR CARRYING OUT THE INVENTION (1) Composition of Titanium Oxynitride:

The titanium oxynitride of the present invention is represented by $TiN_xO_y$ and, if necessary, may contain silicon oxide represented by $SiO_2$, and silicon oxide may form a mixture with titanium oxynitride or may attach to the surface of particles of titanium oxynitride, or may form a composite with titanium oxynitride or may dissolve in the particles of titanium oxynitride in the state of solid solution. Therefore, the titanium oxynitride of the present invention is represented by the formula: $TiN_xO_y \cdot nSiO_2$, and in the formula, Ti represents titanium atom, N represents nitrogen atom, O represents oxygen atom, Si represents silicon atom, x represents a ratio of nitrogen atom to titanium atom, y represents a ratio of oxygen atom to titanium atom, n represents a molar ratio of $SiO_2$ to $TiN_xO_y$, and x and y can respectively be a real number of more than 0 and less than 2, and for obtaining titanium oxynitride of desired high nitriding degree, the ratio of y/x is preferably 0.10-0.60, more preferably 0.15-0.50, further preferably 0.15-0.40, most preferably 0.15-0.30. The titanium oxynitride may or may not contain silicon oxide, and silicon oxide is expected to have actions to inhibit sintering, accelerate nitriding and provide oxidation stability of titanium oxynitride in production of titanium oxynitride, and to have a dispersing effect in dispersing the titanium oxynitride in resin and solvent, and it may be anhydrous silicon oxide, silicon oxide having water adsorbed thereto, or hydrous silicon oxide. The silicon oxide is apt to become anhydrous silicon oxide when it is used in producing titanium oxynitride at high temperatures. The silicon oxide is considered to be present in the state of $SiO_2$, and in case firing with ammonia gas or amine gas at high temperatures is carried out in producing titanium oxynitride, a part of silicon oxide may be nitrided to produce oxynitride or nitride, and oxynitride or nitride of silicon may be present in the present invention. The molar ratio n of silicon oxide can be a real number in the range of $0 \leq n \leq 0.05$, preferably $0.001 \leq n \leq 0.04$, more preferably $0.003 \leq n \leq 0.03$.

Titanium atom and silicon atom are analyzed by ICP emission spectrochemical analysis, oxygen atoms is analyzed by inert gas fusion infrared absorption method, and nitrogen atom is analyzed by carbon hydrogen nitrogen elemental analyser, and x and n are calculated from the resulting analytical values. In the case of silicon atom being present, it is assumed that the silicon atom bonds to oxygen atom to become silicon oxide $SiO_2$, and a value obtained by subtracting the amount of oxygen atom which bonds to silicon atom to form $SiO_2$ from the analytical value of oxygen atom is taken as the amount of oxygen atom in $TiN_xO_y$, and y is calculated therefrom.

(2) Nitrogen Content and Oxygen Content in Titanium Oxynitride:

It is important that the content of nitrogen represented by N in $TiN_xO_y \cdot nSiO_2$ is not less than 17% by weight and less than 23% by weight, and the content is preferably 19-22% by weight, more preferably 18-22% by weight, further preferably more than 20% by weight and not more than 22% by weight. When the content of nitrogen is not less than 17% by weight, particularly, when it exceeds 20% by weight, the titanium oxynitride has reddish black color, but when it is contained in a coating film, the film shows metallic luster to enhance reflectance for visible light and increase hiding properties (light-blocking properties). In the composition of titanium nitride TiN, nitrogen is contained in an amount of about 23% by weight while the nitrogen content in the titanium oxynitride of the present invention is less than the content in TiN.

On the other hand, when the content of oxygen represented by O in $TiN_xO_y$ is 0.5-15% by weight, oxidation with time hardly proceeds and the titanium oxynitride is stable, and this range is preferred. The oxygen content is more preferably 1-13% by weight, further preferably 2-11% by weight, more preferably 3-10% by weight, and most preferably 4-9% by weight.

(3) X-Ray Diffraction of Titanium Oxynitride:

In X-ray diffraction (using Cuα ray) of titanium oxynitride, there are observed a main (first) peak between 40-45° as 2θ and a second peak between 35-40° as 2θ, and with changing the content of nitrogen, the angle of the first peak gradually shifts. For example, when x in $TiN_xO_y$ is 0.85-1, with increase of x, the position of the peak shifts to the smaller angle side, and when x is about 0.95, 2θ is about 42.9°, when x is about 0.93, 2θ is about 43.0°, and when x is about 0.89, 2θ is about 43.2°. Being different from the position of the main peak of titanium nitride (42.6°), the main (first) peak of the titanium oxynitride of the present invention is confirmed on the larger angle side, for example, in the range of 42.7°-43.5°, and therefore the titanium oxynitride of the present invention is different from titanium nitride or titanium nitride the surface of which is partially oxidized. Furthermore, titanium oxynitride is obtained by heating and firing titanium oxides, e.g., titanium dioxide, hydrous titanium oxide, titanium hydroxide, and lower order titanium oxides such as TiO, $Ti_2O_3$ and $Ti_3O_5$ in the presence of ammonia gas, amine gas or the like, and, therefore, in case the titanium oxide used as a starting material remains, an X-ray diffraction peak resulting from titanium dioxide or the like can be confirmed. In the present invention, it is preferred to carry out reduction to such an extent that titanium dioxide or the like which is impurity cannot be confirmed in X-ray diffraction peaks. The peak in X-ray diffraction of titanium dioxide appears in 25-26° for anatase type titanium dioxide, and 27-28° for rutile type titanium dioxide. On the other hand, the X-ray diffraction peak of silicon oxide cannot be confirmed even when it is present in a considerable amount.

The size of crystallites constituting titanium oxynitride particles can be obtained by the following formula 1 of Scherrer's formula from the half width of X-ray diffraction main (first) peak of titanium oxynitride. Commercially available titanium black has a crystallite diameter of 26 nm, but it is important that the titanium oxynitride of the present invention has a crystallite diameter in the range of 17-25 nm. Within this range, the titanium oxynitride has relatively high degree of blackness due to the size effect even if the nitriding degree is increased, and thus this range is preferred. The range of the crystallite diameter is more preferably 19-24 nm, further preferably 19.5-23 nm, most preferably 20-22 nm.

The formula 1: $D=0.9\lambda/(\beta_{1/2} \times \cos \theta)$ (in the formula 1, D is a crystallite diameter (Å) to be calculated, λ is a wavelength of X-ray and 1.54 Å of Cuα ray is used, and $\beta_{1/2}$ denotes a half width (radian) of the main (first) peak and θ denotes an angle of reflection.

(4) Degree of Blackness of Titanium Oxynitride:

Titanium oxynitride has blackish color, which includes pure black and other colors such as bluish black, purplish black, reddish black and brownish black. The lightness and hue of titanium oxynitride are obtained in the following manner. That is, 1.5 g of a sample is put in a round cell made of glass (Part No. 1483 manufactured by Nippon Denshoku Industries Co., Ltd.) and is subjected to colorimetry from the bottom of the cell using a differential colorimeter (Color Meter ZE2000 manufactured by Nippon Denshoku Industries Co., Ltd.), and the lightness and hue are obtained by Lab color system. The degree of blackness is expressed by value L of psychometric lightness, and the smaller the value L, the higher the degree of blackness. The titanium oxynitride of the present invention can have a degree of blackness of, for example, about 2-20, preferably about 8-13 in terms of value L.

Furthermore, value a and value b of Lab color system which are obtained in the same manner as the value L are indexes which show hue saturation, and value a which is greater on the positive side shows stronger reddishness and value a which is greater on the negative side shows stronger greenishness, and value b which is greater on the positive side shows stronger yellowishness and value b which is greater on the negative side shows stronger bluishness. The titanium oxynitride of the present invention can have a hue of, for example, about 2 to 5 as value a and about −1 to 5 as value b.

(5) Visible Light Reflectance of Titanium Oxynitride:

Since titanium oxynitride has a blackish color, it has naturally great absorption of visible light, but for further improvement of hiding properties, it is considered to utilize reflection of visible light in addition to absorption of visible light. That is, when the minimum value of reflectance in the range of 400-800 nm in wavelength is smaller and reflectance for visible light in the longer wavelength region is higher, the higher hiding properties (light-blocking properties) can be obtained. Regarding the reflection of visible light, when 0.3 g of titanium oxynitride powder packed in a cylindrical cell (Model PSH-001 having a diameter of 16 mm manufactured by JASCO Corporation) is subjected to measurement of reflection spectrum of visible light using an ultraviolet and visible spectrophotometer (V-570 manufactured by JASCO Corporation) (barium sulfate powder is used as a comparative sample), it is generally said that a wavelength of light showing minimum value of reflectance in the wavelength region of 400-800 nm is present and the light having a wavelength more than the above region is reflected. Therefore, if the wavelength of light showing the minimum value of reflectance is shifted to the lower wavelength side by changing composition of titanium oxynitride, reflection of visible light can be increased. As a result of conducting researches from such a viewpoint, it can be confirmed that since the titanium oxynitride of the present invention is high in degree of blackness and small in crystallite diameter, the wavelength of light which shows the minimum value of reflectance is shifted to the lower wavelength side by the size effect. When the wavelength which shows the minimum value of reflectance is less than about 550 nm, the desired reflection effect can be obtained and hence the above range of wavelength is preferred, and is more preferably less than about 490 nm. The minimum value of the reflectance varies depending on the crystallite diameter, specific surface area and degree of nitriding of the titanium oxynitride, while the titanium oxynitride of the present invention has a specific crystallite diameter, specific surface area, nitrogen content, etc., and hence the minimum value of reflectance can be reduced and absorption rate in the above wavelength can be increased. The minimum value of reflectance measured in the range of wavelength of 400-800 nm is preferably 11.5% or less. Furthermore, when the visible light reflectance is shown representing the reflectance in the wavelength of 650 nm (red light), it is preferably at least about 11%, more preferably at least about 13%, further preferably at least about 14%, and most preferably at least about 15%. Accordingly, in the present invention, it is preferred that the reflectance at the wavelength of 650 nm is at least 11%, the wavelength showing the minimum value of reflectance is present in 550 nm or less, and the minimum value is 11.5% or less.

(6) Particle Diameter of Titanium Oxynitride:

When particles of $TiN_xO_y \cdot nSiO_2$ have a particle diameter in the range of 0.02-0.5 μm measured by observing with an electron microscope, they have excellent hiding properties, and hence this range is preferred, and the range is more preferably 0.02-0.25 μm, further preferably 0.03-0.2 μm, most preferably 0.03-0.1 μm. In the case of containing silicon oxide, the presence of it cannot be confirmed by electron microscope, but it is supposed that silicon oxide attaches to the surface of titanium oxynitride particles.

(7) Specific Surface Area of Titanium Oxynitride:

When the specific surface area of titanium oxynitride measured by BET method is in the range of 5-30 $m^2/g$, titanium oxynitride is readily dispersed in a resin binder to give excellent hiding properties, and the above range is preferred and is more preferably 10-25 $m^2/g$.

(8) Powder Resistance:

In the case of using titanium oxynitride as a conductivity-imparting agent, the lower powder resistance, namely, the higher conductivity is preferred. On the other hand, in the case of using as a black matrix of color filters in IPS (in-plane switching) type color display system or a small color display system which is not IPS system, wrong operation is apt to occur if the black matrix has conductivity. The powder resistance of titanium oxynitride used for the above uses is preferably 1Ω·cm or higher, more preferably 10Ω·cm or higher.

(9) Method for the Production of Titanium Oxynitride:

The titanium oxynitride of the present invention can be produced by raising the temperature of an apparatus charged with a titanium oxide in the presence of a nitrogen-containing reducing agent to about 750-1200° C. to carry out firing with heating. The heating and firing temperature is preferably about 850-1100° C., more preferably about 950-1050° C., most preferably about 970-1000° C. In the present invention, titanium oxynitride higher in degree of nitriding and smaller in crystallite diameter can be produced by optimizing the heating and firing temperature. If the heating and firing temperature is lower than the above range, nitriding can hardly proceed and the desired titanium oxynitride can hardly be obtained, and if the temperature is higher than the above range, sintering proceeds and fine particles can hardly be obtained. The heating and firing time may be optionally set because it varies depending on the amount of the titanium oxide used or the nitrogen-containing reducing agent, and is suitably about 1-20 hours, preferably 3-10 hours for operation. Moreover, cooling may be carried out after heating and firing and thereafter the heating and firing may further be repeated. As the heating and firing apparatus, there may be used known apparatuses such as fluidized bed apparatus, rotary kiln and tunnel kiln, and the rotary kiln is especially preferred. As the nitrogen-containing reducing agents, there may be used, for example, ammonia, alkylamines such as methylamine and dimethylamine, hydrazine and hydrazine compounds such as hydrazine sulfate and hydrazine hydrochloride, and these can be used each alone or in admixture of two or more. Of these compounds, ammonia and alkylamines are preferred because they can be contacted with titanium oxide in gaseous form and can carry out the reaction uniformly. Furthermore, addition of a slight amount of nitrogen, hydrogen or hydrocarbon to these nitrogen-containing reducing agents can accelerate nitriding and is preferred. Particularly, hydrocarbon is preferred because it reacts with oxygen in the titanium oxide to become carbon dioxide, and hence production of water which inhibits nitriding reaction can be restrained.

The titanium oxides referred to in the present invention are compounds including the usual titanium dioxides such as rutile type (R type) and anatase type (A type) and furthermore hydrated titanium oxide, hydrous titanium oxide, titanium hydroxide and lower order titanium oxides such as $TiO$, $Ti_2O_3$ and $Ti_3O_5$. The titanium dioxides are obtained, for example, by heating and firing hydrous titanium oxide (or titanium hydroxide) at a temperature of about 800-1000° C. in an atmosphere of air or oxygen-containing gas or an inert gas atmosphere such as nitrogen or argon. The hydrous titanium oxide is obtained, for example, in the following manner. That is, a titanium-containing ore such as ilmenite ore or titanium slug, which is ground, if necessary, is dissolved with sulfuric acid to react the titanium component with sulfuric acid to produce titanyl sulfate ($TiOSO_4$), followed by classifying with leaving to stand, filtering, and then hydrolyzing titanyl sulfate with heating to obtain the desired hydrous titanium oxide. If water is present in the nitriding reaction which comprises heating and firing titanium oxide in the presence of a nitrogen-containing reducing agent, the nitriding reaction becomes difficult to proceed, and hence it is preferred to use titanium dioxide rather than hydrated titanium oxide, hydrous titanium oxide and titanium hydroxide, and it is more preferred to use anatase type titanium dioxide because this is more easily nitrided than rutile type titanium dioxide.

In the present invention, when silicon oxide is coated on the surface of particles of titanium oxide and thereafter the titanium oxide particles are fired with heating, the particles are hardly sintered even at the higher temperatures in the above range, and besides nitriding readily proceeds because rutile type titanium oxide is hardly produced in the course of reaction, and thus, fine titanium oxynitride can be further easily obtained. Therefore, the coating with silicon oxide is preferred. The silicon oxide may be coated in the form of either porous silicon oxide or dense silicon oxide, but coating in the form of dense silicon oxide is preferred because the effect to inhibit sintering can be easily obtained. The coating amount of silicon oxide shown by molar ratio n to $TiN_xO_y$ obtained by heating and firing may be $0<n\leq0.05$, preferably $0.001\leq n\leq0.04$, more preferably $0.003\leq n\leq0.03$. If the coating amount of silicon oxide is less than the above range, the desired effect to inhibit sintering can hardly be obtained, and if it is more than the above range, nitriding hardly proceeds.

For coating the dense silicon oxide, there may be used known methods disclosed in JP-A-53-33228, JP-A-7-8971, etc. The method disclosed in JP-A-53-33228 comprises rapidly adding sodium silicate to a slurry of titanium oxide kept at a temperature of 80-100° C. and, preferably, adjusted to a pH of 9-10.5, followed by neutralizing at a pH of 9-10.5 and then keeping the temperature of 80-100° C. for 50-60 minutes. The method disclosed in JP-A-7-8971 comprises adjusting the pH of a slurry of titanium oxide to 9.5-11, then gradually adding a silicate at 60° C. or higher, preferably 70° C. or higher, further preferably 90° C. or higher over 30-120 minutes, thereafter neutralizing the slurry, and then keeping the slurry for 60-120 minutes while maintaining the slurry temperature. Sodium silicate, potassium silicate, etc. can be used as the silicate, and acidic compounds, e.g., inorganic acids such as sulfuric acid and hydrochloric acid and organic acids such as acetic acid and formic acid can be used as the neutralizing agent. After coating the silicon oxide, preferably the slurry is subjected to dehydration, washing, and heating and firing step.

The method for coating porous silicon oxide comprises rapidly adding sodium silicate with keeping the temperature of a slurry of titanium oxide at 70° C. or lower, followed by neutralizing and then keeping a temperature of 70° C. or lower for 30 minutes or shorter.

If necessary, the titanium oxynitride thus produced may be subjected to dry grinding by a known method or may be made to a slurry, followed by wet grinding, dehydration, drying and then dry grinding. A vertical sand mill, horizontal sand mill, or the like can be used for wet grinding, a band type heater, batch type heater, or the like can be used for drying, and an impact grinder such as a hammer mill or a pin mill, a trituration grinder such as a disintegrator, an airborne grinder such as a jet mill or a snail mill, an apparatus such as a spray dryer can be used for dry grinding.

(10) Surface Treatment of Titanium Oxynitride:

The surface of the particles of the titanium oxynitride of the present invention may be coated with at least one compound selected from inorganic compounds and organic compounds in order to improve affinity for resin binder or time stability during storage of paint or to improve productivity. The inorganic compounds include, for example, aluminum compounds, silicon compounds, zirconium compounds, tin compounds, titanium compounds and antimony compounds, and these may be coated each alone or coats of two or more of them may be laminated, or two or more inorganic compounds may be coated in admixture. More preferred is at least one inorganic compound selected from oxides, hydroxides, hydrated oxides and phosphates. The organic compounds include, for example, polyhydric alcohols, alkanolamines or derivatives thereof, organosilicon compounds, higher fatty acids or metallic salts thereof, and organometallic compounds. Specific examples thereof are (1) trimethylolethane, trimethylolpropane, tripropanolethane, pentaerythritol, etc. as the polyhydric alcohols; (2) triethanolamine, tripropanolamine, etc. as the alkanolamines; (3) as the organosilicon compounds, (a) polysiloxanes (dimethylpolysiloxane, methyl-hydrogen polysiloxane, methylphenylpolysiloxane, dimethylpolysiloxanediol, alkyl-modified silicone oils, alkyl aralkyl-modified silicone oils, amino-modified silicone oils, both ends amino-modified silicone oils, epoxy-modified silicone oils, both ends epoxy-modified silicone oils, fluorine-modified silicone oils, etc.), and (b) organosilanes (alkylsilanes such as n-butyltriethoxysilane, isobutyltrimethoxysilane, n-hexyltrimethoxysilane, n-hexyltriethoxysilane, n-octyltrimethoxysilane, n-octyltriethoxysilane, n-decyltrimethoxysilane, n-octadecyltrimethoxysilane and n-octadecylmethyldimethoxysilane, phenylsilanes such as phenyltriethoxysilane, non-reactive silanes, e.g., fluorosilanes such as trifluoropropyltrimethoxysilane, silane coupling agents such as aminopropyltriethoxysilane, N-(β-aminoethyl)-γ-aminopropyltriethoxysilane, N-phenyl-γ-aminopropyltrimethoxysilane, vinyltrimethoxysilane, vinyltriethoxysilane, vinyltrichlorosilane, γ-glycidoxypropyltrimethoxysilane, methacryloxypropyltrimethoxysilane, β-(3,4-epoxycyclohexyl)ethyltrimethoxysilane); (4) stearic acid, lauric acid, etc. as the higher fatty acids, and magnesium salts, zinc salts, etc. as the metallic salts of the higher fatty acids; (5) as the organometallic compounds, titanium coupling agents such as isopropyltriisostearoyl titanate, isopropyltris(dioctylpyrophosphate)titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate and isopropyltri(N-amidoethyl•aminoethyl)titanate, aluminum coupling agents such as acetoalkoxyaluminumdiisopropylate, zirconium compounds such as zirconiumtributoxyacetylacetonate and zirconiumtributoxystearate, and the like. These may be coated each alone or in combination of two or more. The coating amount can be optionally set, and is preferably about 0.01-30% by weight, more preferably 0.05-10% by weight, further preferably 0.1-5% by weight based on the titanium oxynitride. The inorganic compound or organic compound can be coated on the surface of the titanium oxynitride using known methods such as wet method or dry method, for example, at the time of dry grinding of titanium oxynitride, at the time of formation of a slurry or at the time of wet grinding. In the case of carrying out the surface treatment by the wet method, it is preferred to wet grind the titanium oxynitride before or during the treatment. The surface treatment by wet method can be carried out either in water system or in solvent system, and the aqueous system is preferred from the points of environment, cost and equipment. However, when the water system is used, especially when wet grinding is carried out, titanium oxynitride is slightly oxidized with water per se or dissolved oxygen in water, and hence it is preferred to carry out the wet grinding in the presence of a reducing agent such as hydrazine, sodium borohydride, formaldehyde, tartaric acid, glucose, sodium hypophosphite or N-N-diethylglycine sodium.

(11) Titanium Oxynitride-Containing Composition

When the black titanium oxynitride of the present invention is contained in a resin such as paint, ink or plastic molding such as film as a black pigment or conductivity-imparting agent, there can be obtained a resin composition which utilizes the excellent hiding properties (light-blocking properties), blackness and conductive performance of the titanium oxynitride. In this resin composition, there may be contained the black titanium oxynitride of the present invention in an optional amount, preferably, 20% by weight or more, and, furthermore, there may be added composition-forming materials used in the respective fields and various additives to the resin composition. In the case of preparing paints or inks, to the composition are added a coating film-forming material or ink film-forming material, a solvent, a dispersing agent, a pigment, a filler, a thickening agent, a flow controlling agent, a leveling agent, a curing agent, a cross-linking agent, a curing catalyst, etc. As the coating film-forming materials, there may be used organic components such as acrylic resin, alkyd resin, urethane resin, polyester resin and amino resin, or inorganic components such as organosilicates and organotitanates, and as the ink film-forming materials, there may be used urethane resin, acrylic resin, polyamide resin, vinyl chloride-vinyl acetate copolymer resin and chlorinated vinyl acetate resin, chlorinated propylene resin, etc. For these coating film-forming materials and ink film-forming materials, there may be used thermosetting resins, cold-setting resins, ultraviolet-curing resins, etc., which are not particularly limited, and when an ultraviolet-curing resin of monomer or oligomer is used with addition of a photopolymerization initiator or photosensitizer, and the resin is cured by irradiation with ultraviolet rays after coating, no heat load is applied to the substrate, and thus there can be obtained a coating film excellent in hardness and adhesion. In the case of plastics moldings, plastics, pigments, dyes, dispersing agents, lubricants, antioxidants, ultraviolet absorbers, light stabilizers, antistatic agents, flame-retardants, bactericides, etc. are incorporated together with the black titanium oxynitride of the present invention, followed by molding into optional forms such as film. As the plastics, there may be used thermoplastic resins such as polyolefin resins, polystyrene resins, polyester resins, acrylic resins, polycarbonate resins, fluorocarbon resins, polyamide resins, cellulose resins, and polylactic acid resins, and thermosetting resins such as phenolic resins and urethane resins.

EXAMPLES

The present invention will be explained in more detail by the following examples and comparative examples, which should not be construed as limiting the invention.

Example 1

1. Coating of Silicon Oxide on Titanium Dioxide:

Hydrous titanium dioxide in an amount of 300 g in terms of $TiO_2$ was suspended in 1 liter of water to prepare a slurry, pH of the slurry was adjusted to 10 with an aqueous sodium hydroxide solution, then the slurry was heated to 70° C., and, thereafter, an aqueous sodium silicate solution was dropped in the slurry for 2 hours. Successively, the slurry was heated to 90° C. and then dilute sulfuric acid was dropped in the slurry for 2 hours to neutralize the slurry to a pH of 5, and, furthermore, it was kept for 30 minutes. Thereafter, the slurry was dehydrated, washed and, furthermore, fired at 850° C. for 5 hours in the air to obtain titanium dioxide coated with dense silicon oxide (0.3% by weight as $SiO_2$). The resulting titanium dioxide was anatase type.

2. Reduction Firing of Titanium Dioxide:

Then, the above titanium dioxide coated with silicon oxide was charged in a quartz tube of 7.5 cm in inner diameter, and the quartz tube was heated at 980° C. for 6 hours while passing ammonia gas at a rate of 10 liters/min through the tube. Then, the resulting product was cooled to 100 C° in the same atmosphere, and further cooled to normal temperature by leaving it in the air to obtain titanium oxynitride of the present invention having a chemical composition represented by the formula $TiN_{0.95}O_{0.20}.0.01SiO_2$ (Sample A)

Example 2

Hydrous titanium dioxide was fired at 850° C. for 5 hours in the air to obtain titanium dioxide which was not coated with silicon oxide. The resulting titanium dioxide was rutile type. This titanium dioxide which was not coated with silicon oxide was charged in a quartz tube of 7.5 cm in inner diameter, and the quartz tube was heated at 980° C. for 3 hours while passing ammonia gas at a rate of 10 liters/min through the tube. Then, the resulting product was cooled to 100° C. in the same atmosphere, and further cooled to normal temperature by leaving it in the air. At this stage, in X-ray diffraction, a peak of rutile type titanium oxide was recognized in addition to the peak of titanium oxynitride. The product was again charged in a quartz tube of 7.5 cm in inner diameter, and the quartz tube was heated at 980° C. for 3 hours while passing ammonia gas at a rate of 10 liters/min through the tube. Then, the resulting product was cooled to 100° C. in the same atmosphere, and further cooled to normal temperature by leaving it in the air to obtain titanium oxynitride of the present invention having a chemical composition represented by the formula $TiN_{0.96}O_{0.19}.0SiO_2$ (Sample B).

Example 3

Titanium oxynitride of the present invention having a chemical composition represented by the formula $TiN_{0.93}O_{0.31}.0.01SiO_2$ (Sample C) was obtained in the same manner as in Example 1, except that the heating and reducing time at 980° C. was 3 hours.

Example 4

Titanium oxynitride of the present invention having a chemical composition represented by the formula $TiN_{0.89}O_{0.48}.0.01SiO_2$ (Sample D) was obtained in the same manner as in Example 1, except that the heating and reducing conditions were 900° C. and 3 hours.

COMPARATIVE EXAMPLE 1

Titanium dioxide which was coated with silicon oxide (9% by weight as $SiO_2$) in the same manner as in Example 1 was charged in a quartz tube of 7.5 cm in inner diameter, and the quartz tube was heated at 900° C. for 3 hours while passing ammonia gas at a rate of 10 liters/min through the tube. Then, the resulting product was cooled to 100° C. in the same atmosphere, and further was cooled to normal temperature by leaving it in the air to obtain titanium oxynitride having a chemical composition represented by the formula $TiN_{0.88}O_{0.64}.0.01SiO_2$ (Sample E).

COMRARATIVE EXAMPLE 2

A commercially available titanium black (13M-C manufactured by Mitsubishi Material Co., Ltd.) having a chemical composition represented by the formula $TiN_{0.75}O_{0.58}.0.01SiO_2$ was used as Sample F.

Compositions and characteristics of Samples A-F obtained in Examples and Comparative Examples are shown in Table 1. It can be seen that the titanium oxynitrides of the present invention were high in nitrogen content and small in crystallite diameter, and hence in these titanium oxynitrides, the wavelength which shows the minimum value of visible light reflectance shifted to the lower wavelength side and the visible light reflectance was higher as compared with that in Comparative Examples. Moreover, it can be seen that the titanium oxynitrides of the present invention had pigment characteristics similar to those in Comparative Examples.

mmφ were charged in a glass bottle and ground by a paint conditioner (Model #5110 manufactured by Red Devil Equipment Co., Ltd.), followed by removing the zircon beads to obtain a wet ground slurry. The concentration of the resulting wet ground slurry was adjusted to 250 g/liter with pure water, and pH of the slurry was adjusted to 7.0 with sulfuric acid, followed by adding 0.55 g of γ-glycidoxypropyltrimethoxysilane at room temperature and keeping the slurry for

TABLE 1

| | Example 1 | Example 2 | Example 3 | Example 4 | Comparative Example 1 | Comparative Example 2 |
|---|---|---|---|---|---|---|
| Composition formula | $TiN_{0.95}O_{0.20} \cdot 0.01SiO_2$ | $TiN_{0.96}O_{0.19} \cdot 0SiO_2$ | $TiN_{0.93}O_{0.31} \cdot 0.01SiO_2$ | $TiN_{0.89}O_{0.48} \cdot 0.01SiO_2$ | $TiN_{0.88}O_{0.64} \cdot 0.11SiO_2$ | $TiN_{0.75}O_{0.58} \cdot 0.001SiO_2$ |
| O/N molar ratio | 0.21 | 0.20 | 0.33 | 0.54 | 0.73 | 0.77 |
| Nitrogen content (wt %) | 20.9 | 21.1 | 19.4 | 18.2 | 15.8 | 15.6 |
| Oxygen content (wt %) | 5.3 | 4.9 | 7.6 | 11.5 | 17.7 | 14.1 |
| O/N weight ratio | 0.25 | 0.23 | 0.39 | 0.63 | 1.10 | 0.88 |
| x + y | 1.15 | 1.16 | 1.23 | 1.37 | 1.52 | 1.33 |
| Silicon oxide content (wt %) | 0.5 | 0.0 | 0.5 | 0.5 | 8.6 | 0.1 |
| Presence of titanium dioxide in X-ray diffraction | Absent | Absent | Absent | Absent | Absent | Present (both R and A types) |
| Reflection angle of main peak of titanium oxynitride in X-ray diffraction (°) | 42.9 | 42.9 | 43.0 | 43.2 | 43.1 | 43.0 |
| Value L | 12.8 | 12.4 | 10.2 | 8.1 | 6.5 | 10.6 |
| Value a | 3.2 | 3.7 | 3.0 | 2.2 | 0.6 | 1.8 |
| Value b | 3.9 | 3.2 | 1.5 | −1.2 | −2.0 | 0.0 |
| Wavelength of light of minimum reflectance (nm) | 470~480 | 470~490 | 480~500 | 540~550 | 560~600 | 500~530 |
| Minimum reflectance (%) | 11.2 | 11.2 | 11.2 | 10.7 | 9.9 | 11.8 |
| Light reflectance of 650 nm (%) | 15.9 | 14.8 | 13.4 | 11.8 | 10.3 | 13.6 |
| Particle diameter (μm) | 0.03~0.10 | 0.03~0.10 | 0.03~0.08 | 0.03~0.08 | 0.01~0.03 | 0.03~0.10 |
| Specific surface area (m$^2$/g) | 11.0 | 15.4 | 19.3 | 21.7 | 79.8 | 17.0 |
| Crystallite diameter (nm) | 20 | 21 | 22 | 22 | 16 | 26 |
| Oxidation stability | good | good | good | good | good | good |

Example 5

1. Coating of Silicon Oxide on Titanium Dioxide:

Hydrous titanium dioxide in an amount of 300 g in terms of $TiO_2$ was suspended in 1 liter of water to prepare a slurry, pH of the slurry was adjusted to 10 with an aqueous sodium hydroxide solution, then the slurry was heated to 70° C., and, thereafter, an aqueous sodium silicate solution was dropped in the slurry for 2 hours. Successively, the slurry was heated to 90° C. and then dilute sulfuric acid was dropped in the slurry for 2 hours to neutralize the slurry to a pH of 5, and, furthermore, the slurry was kept for 30 minutes. Thereafter, the slurry was dehydrated, washed and fired at 850° C. for 5 hours in the air to obtain titanium dioxide coated with dense silicon oxide (0.3% by weight as $SiO_2$). The resulting titanium dioxide was anatase type.

2. Reduction Firing of Titanium Dioxide:

Then, the above titanium dioxide coated with silicon oxide was charged in an SUS310 tube of 25.5 cm in inner diameter, and the SUS310 tube was heated at 980° C. for 3 hours while passing ammonia gas at a rate of 265 liters/min through the tube. Then, the resulting product was cooled to 100° C. in the same atmosphere, and further cooled to normal temperature by leaving it in the air to obtain titanium oxynitride of the present invention of 20.0% by weight in nitrogen content (Sample G).

Example 6

27.5 g of the titanium oxynitride obtained in Example 5 (Sample G), 64 ml of water and 161.8 g of zircon beads of 0.5 mmφ were charged in a glass bottle and ground by a paint conditioner (Model #5110 manufactured by Red Devil Equipment Co., Ltd.), followed by removing the zircon beads to obtain a wet ground slurry. The concentration of the resulting wet ground slurry was adjusted to 250 g/liter with pure water, and pH of the slurry was adjusted to 7.0 with sulfuric acid, followed by adding 0.55 g of γ-glycidoxypropyltrimethoxysilane at room temperature and keeping the slurry for 80 minutes. Thereafter, the slurry was heated to 80° C., stirred for 2 hours, adjusted to a pH of 2.5, then dehydrated, washed, and dried to obtain titanium oxynitride which was surface treated with 2% by weight of γ-glycidoxypropyltrimethoxysilane (Sample H).

Example 7

27.5 g of the titanium oxynitride obtained in Example 5 (Sample G), 64 ml of water and 161.8 g of zircon beads of 0.5 mmφ were charged in a glass bottle and ground by a paint conditioner (Model #5110 manufactured by Red Devil Equipment Co., Ltd.), followed by removing the zircon beads to obtain a wet ground slurry. The concentration of the resulting wet ground slurry was adjusted to 250 g/liter with pure water, followed by adding 0.55 g of isopropyltri(N-amidoethyl•aminoethyl)titanate at room temperature and keeping the slurry for 20 minutes. Thereafter, the slurry was dehydrated, washed, and dried to obtain titanium oxynitride which was surface treated with 2% by weight of isopropyltri (N-amidoethyl•aminoethyl) titanate (Sample I).

Example 8

27.5 g of the titanium oxynitride obtained in Example 5 (Sample G), 64 ml of water and 161.8 g of zircon beads of 0.5 mmφ were charged in a glass bottle and ground by a paint conditioner (Model #5110 manufactured by Red Devil Equipment Co., Ltd.), followed by removing the zircon beads to obtain a wet ground slurry. The concentration of the resulting wet ground slurry was adjusted to 250 g/liter with pure water, followed by adding a mixed solution comprising 0.55 g of isopropyltris(dioctylpyrophosphate)titanate and 0.27 g of triethylamine at room temperature, keeping the slurry for 20 minutes, adjusting the pH to 4.5 with sulfuric acid, dehydrating, washing, and drying to obtain titanium oxynitride which was surface treated with 2% by weight of isopropyltris (dioctylpyrophosphate)titanate (Sample J).

Example 9

27.5 g of the titanium oxynitride obtained in Example 5 (Sample G), 64 ml of water and 161.8 g of zircon beads of 0.5 mmϕ were charged in a glass bottle and ground by a paint conditioner (Model #5110 manufactured by Red Devil Equipment Co., Ltd.), followed by removing the zircon beads to obtain a wet ground slurry. The concentration of the resulting wet ground slurry was adjusted to 250 g/liter with pure water. The slurry was heated to 70° C., the pH of the slurry was adjusted to 10.5 with an aqueous sodium hydroxide solution, then an aqueous sodium aluminate solution was dropped in the slurry over 20 minutes, and the slurry was stirred for 20 minutes. Successively, dilute sulfuric acid was dropped in the slurry for 20 minutes to neutralize the slurry to a pH of 7.5, and, furthermore, the slurry was kept for 30 minutes. Thereafter, the slurry was dehydrated, washed and dried to obtain titanium oxynitride which was surface treated with 0.5% by weight of aluminum hydroxide (Sample K).

The compositions and characteristics of Samples G-K obtained in Examples are shown in Table 2. It can be seen that the titanium oxynitrides coated with inorganic compound or organic compound of the present invention were lower in conductivity.

enclosed in an exclusive container under pressure, and the container is subjected to heat treatment.

(Analysis of Oxygen Atom)
Measuring method: Inert gas fusion infrared absorption method
Apparatus: TC436AR manufactured by LECO Corporation
Measuring method: A sample and a platinum tube are introduced into a graphite crucible and are molten by heating at high temperature. At this time, oxygen in the sample reacts with the graphite crucible to produce carbon monoxide. The produced carbon monoxide is monitored by infrared rays to determine the amount of oxygen in the sample.

(Analysis of Nitrogen Atom)
Apparatus: A carbon hydrogen nitrogen elemental analyser (vario ELIII manufactured by Elementar Analysensysteme GmbH)
Measuring conditions:
Detector: Thermal conductivity detector
Temperature of combustion tube: 950° C.
Temperature of reduction tube: 500° C.
Time for introduction of oxygen in combustion of sample: 120 seconds
Standard substance: Acetoanilide
Amount of sample: 3 mg (accurately weighed)

(Lightness and Hue of Titanium Oxynitride)
1.5 g of sample is put in a round cell made of glass (Part No. 1483 manufactured by Nippon Denshoku Co., Ltd.) and is subjected to colorimetry from the bottom of the cell using a

TABLE 2

| | Example 5 | Example 6 | Example 7 | Example 8 | Example 9 |
|---|---|---|---|---|---|
| Nitrogen content (wt %) | 20.0 | 19.3 | 19.3 | 19.5 | 18.7 |
| Silicon oxide content (wt %) | 0.5 | 0.5 | 0.5 | 0.5 | 0.5 |
| Presence of Titanium dioxide in X-ray diffraction | Absent | Absent | Absent | Absent | Absent |
| Reflection angle of main peak of titanium oxynitride in X-ray diffraction (°) | 42.90 | 42.96 | 42.94 | 43.00 | 42.94 |
| Particle diameter (μm) | 0.03~0.10 | 0.03~0.10 | 0.03~0.10 | 0.03~0.10 | 0.03~0.10 |
| Specific surface area (m$^2$/g) | 16.0 | 22.3 | 25.0 | 21.5 | 22.8 |
| Crystallite diameter (nm) | 23 | 21 | 21 | 21 | 21 |
| Oxidation stability | good | good | good | good | good |
| Powder resistance (Ω · cm) | $5.1 \times 10^{-3}$ | $1.5 \times 10^{1}$ | $6.9 \times 10^{0}$ | $1.2 \times 10^{1}$ | $2.3 \times 10^{1}$ |

The measuring methods employed in Examples are shown below.

(X-Ray Diffraction)
Apparatus: RINT 2200 manufactured by Rigaku Corporation
Tube voltage: 40 kV, tube current: 30 mA
Scanning angle: 2θ=20°-50°
Scanning speed: 2°/min, step: 0.020°
Radiation width of sample: 10 mm, divergent slit width: ½°, scattering slit width: ½°
Receiving slit width: 0.15 mm (Analysis of Titanium Atom and Silicon Atom)
Measuring method: ICP emission spectrochemical analysis
Apparatus: GVM-1014 manufactured by Shimadzu Corporation
Pretreatment of sample: The sample is mixed with a mixture of hydrochloric acid and hydrofluoric acid, the mixture is differential colorimeter (Color Meter ZE2000 manufactured by Nippon Denshoku Co., Ltd.), and the lightness and hue are obtained by Lab color system.

(Reflectance of Titanium Oxynitride)
0.3 g of titanium oxynitride powder is packed in a cylindrical cell (Model PSH-001 having a diameter of 16 mm manufactured by JASCO Corporation) and is subjected to measurement of reflection spectrum of visible light using an ultraviolet and visible spectrophotometer (V-570 manufactured by JASCO Corporation) (barium sulfate powder is used as a comparative sample).

(Particle Diameter of Titanium Oxynitride)
Method: Electron microscope
Apparatus: H-7000 manufactured by Hitachi, Ltd.
Applied voltage: 100 V
Magnification: Negative printing magnification: 20,000×; photographic paper printing magnification: 100,000×

(Value of Specific Surface Area)

Method: Simple BET method (nitrogen absorption at liquid nitrogen temperature)

Apparatus: Flow SorbII 2300 manufactured by Shimadzu Corporation

Measurement of amount of sample: About 0.4 g of sample is introduced into an exclusive cell, and the weight after measurement of specific surface area is accurately weighed.

Pretreatment: The sample is subjected to deaeration at 150° C. for 30 minutes in nitrogen.

Method of calculation of specific surface area: Nominal value at elimination of nitrogen (m$^2$)/amount of sample (g)

(Oxidation Stability)

When titanium oxynitride is oxidized, the nitrogen content decreases. Therefore, a sample which does not substantially decrease in nitrogen content in titanium oxynitride after left to stand at room temperature for 1 month is regarded to be "good" in oxidation stability, and a sample which sharply decreases in nitrogen content is regarded to be "bad".

(Powder Resistivity)

Apparatus: MCP-PD51 manufactured by Mitsubishi Chemical Corporation

Probe: MCP-PD511

Amount of sample: 2.5 g

Pressurizing condition: 63.7 MPa

INDUSTRIAL APPLICABILITY

The titanium oxynitride of the present invention is added to resins, paints, inks, cosmetics, etc. as a black pigment. Particularly, it is used as a black pigment added to black matrixes of color filters used in plasma display panels or color liquid crystal display devices. It can further be added to glass, lens, film, etc. as optical materials which block visible light. Furthermore, the titanium oxynitride of the present invention can be used in films, fibers, toners, magnetic recording media, etc. as a conductivity-imparting agent.

Figure 1:
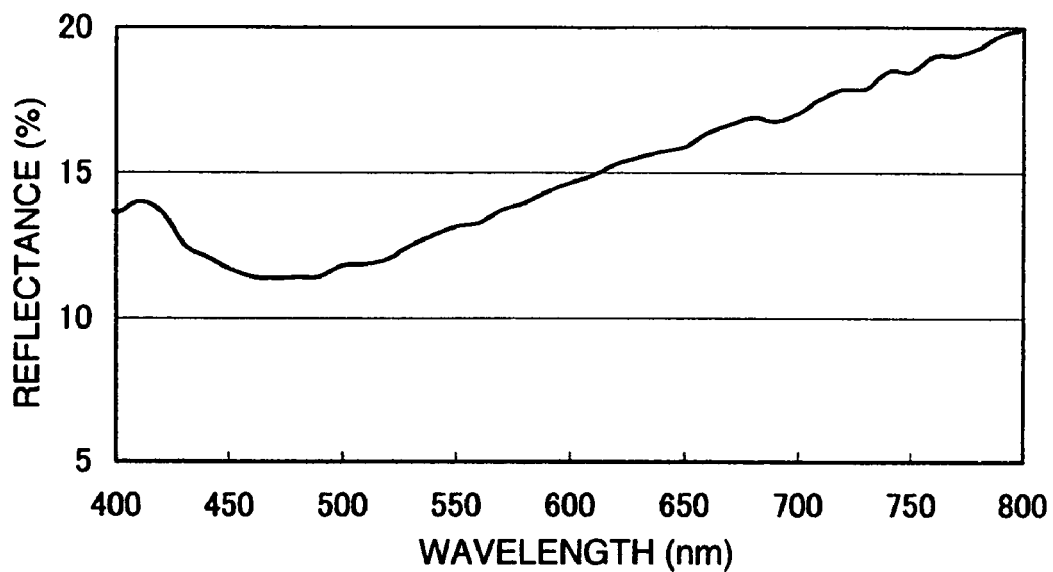
FIG. 1 is a graph which shows a visible light reflection spectrum of Sample A obtained in Example 1.
Figure 2:
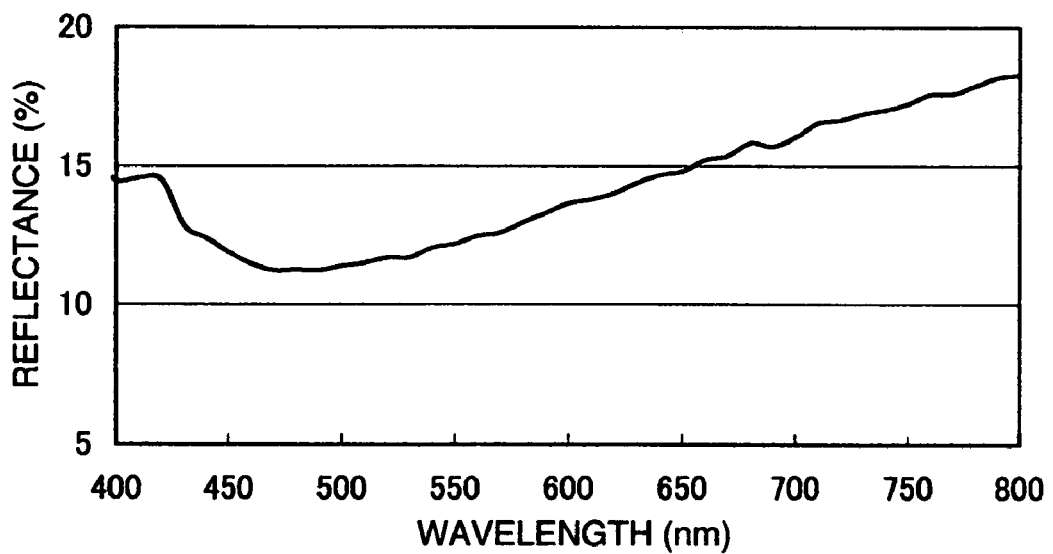
FIG. 2 is a graph which shows a visible light reflection spectrum of Sample B obtained in Example 2.
Figure 3:
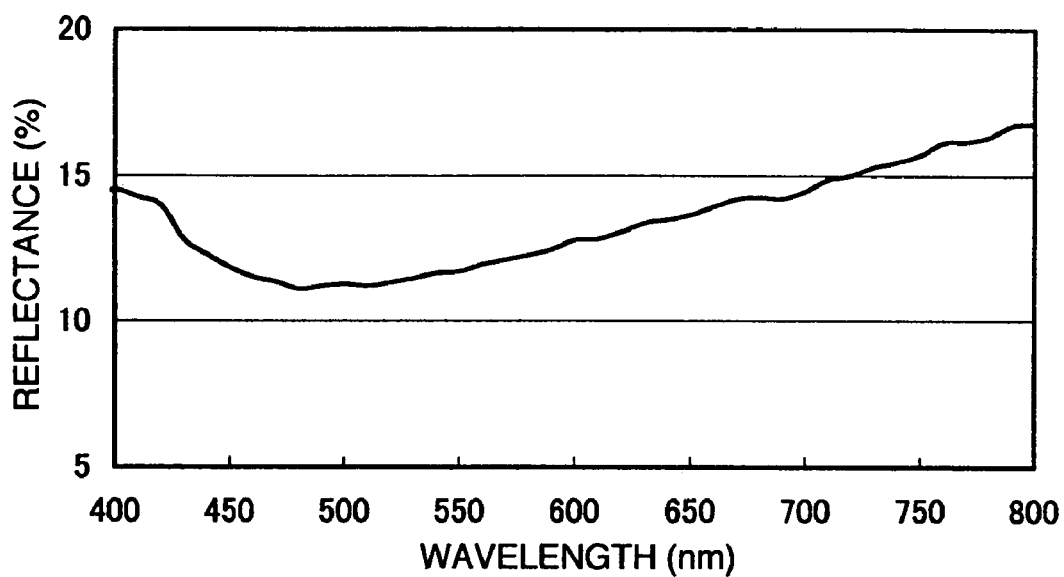
FIG. 3 is a graph which shows a visible light reflection spectrum of Sample C obtained in Example 3.
Figure 4:
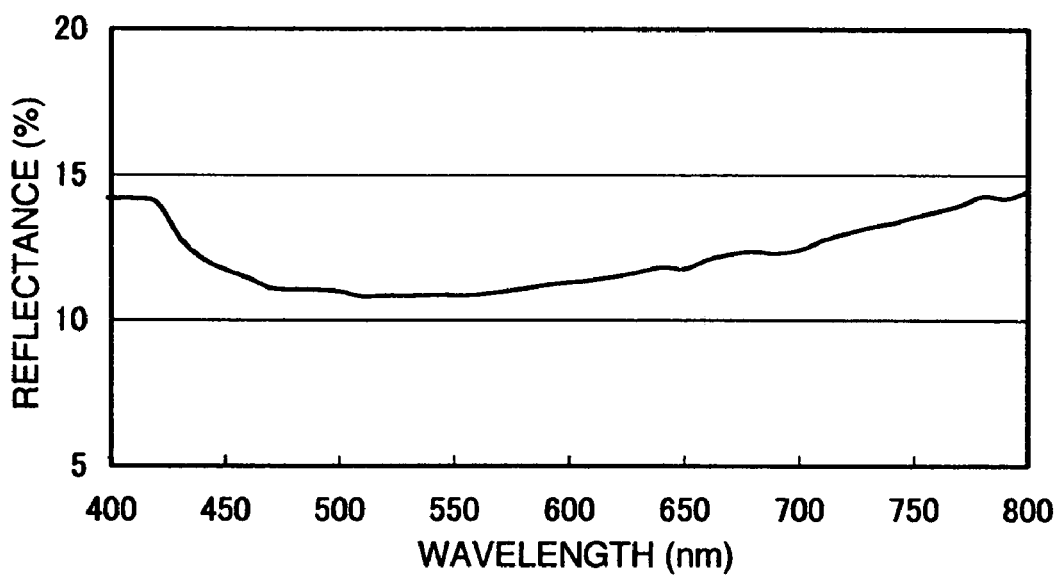
FIG. 4 is a graph which shows a visible light reflection spectrum of Sample D obtained in Example 4.
Figure 5:
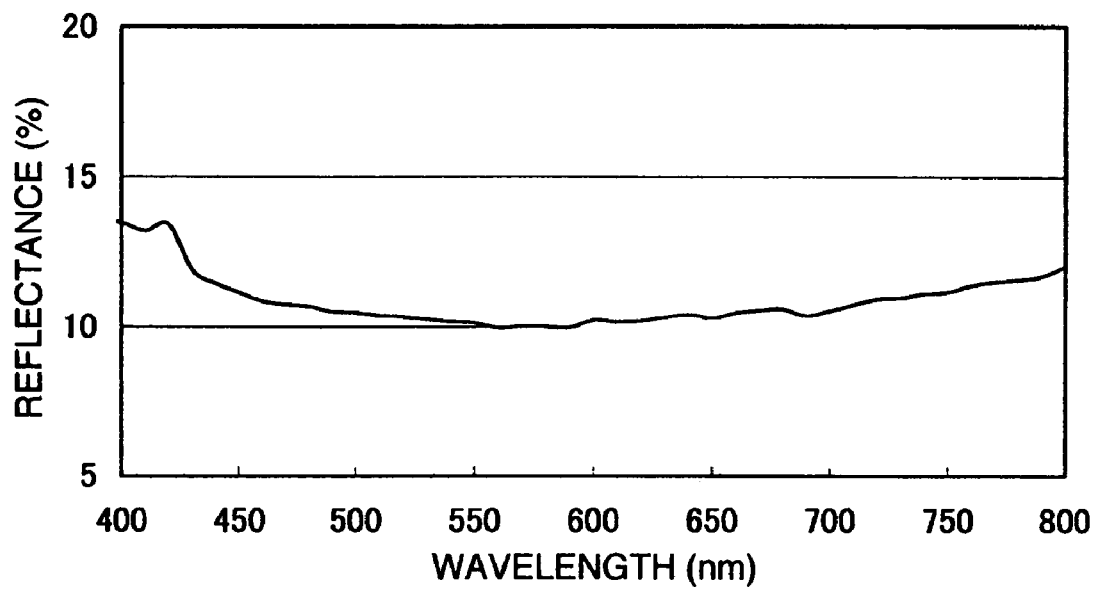
FIG. 5 is a graph which shows a visible light reflection spectrum of Sample E obtained in Comparative Example 1.
Figure 6:
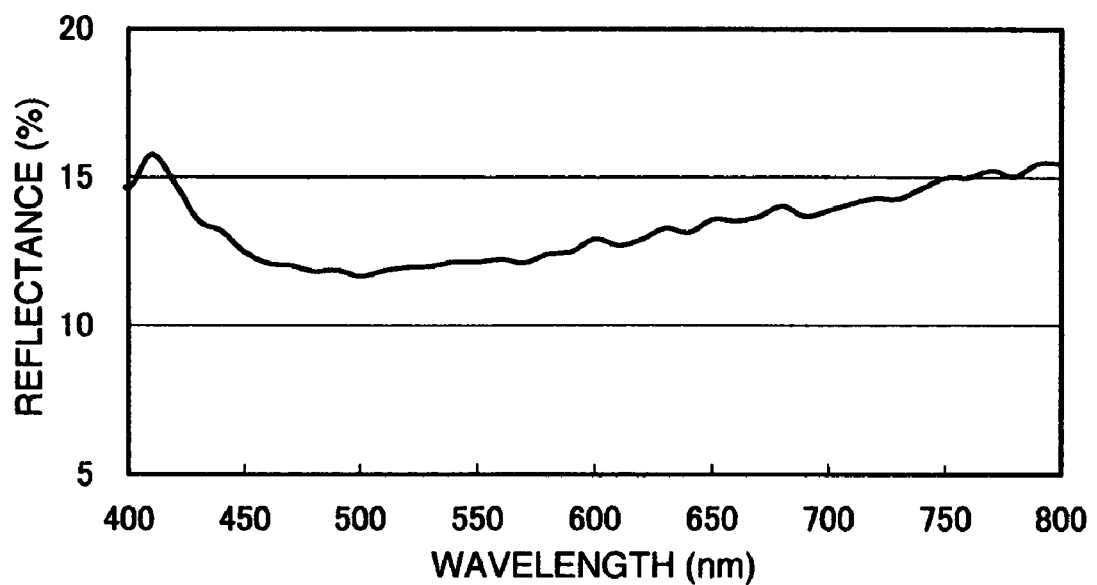
FIG. 6 is a graph which shows a visible light reflection spectrum of Sample F obtained in Comparative Example 2.

The invention claimed is:

1. A black titanium oxynitride which has a chemical composition represented by the formula: $TiN_xO_y \cdot nSiO_2$ wherein x represents a ratio of nitrogen atom to titanium atom, y represents a ratio of oxygen atom to titanium atom, wherein $0<x<2$ and $0<y<2$, n represents a molar ratio of $SiO_2$ to $TiN_xO_y$, wherein $0<n\leqq 0.05$, N is present in an amount by weight $17\leqq N<23$ wt %, said black titanium oxynitride has a specific surface area of 5-30 m$^2$/g and a crystallite diameter of 17-25 nm measured by using an X-ray diffractometer, and said black titanium oxynitride is obtained by a process comprising the following steps:

coating silicon oxide on one or more titanium oxide particles; and firing the titanium oxide particles in the presence of a nitrogen-containing reducing agent.

2. A black titanium oxynitride according to claim 1, wherein a reflectance for a wavelength of 650 nm measured by an ultraviolet and visible spectrophotometer is at least 11% and the minimum value of reflectance in the range of wavelength of 400-800 nm is not more than 11.5%.

3. A black titanium oxynitride according to claim 1, wherein nitrogen atom represented by N is contained in an amount of 19-22% by weight in $TiN_xO_y \cdot nSiO_2$.

4. A black titanium oxynitride according to claim 1, wherein the ratio of y/x in $TiN_xO_y$ is 0.10-0.60.

5. A black titanium oxynitride according to claim 1, wherein the surface of particles is coated with 0.01-30% by weight of an inorganic compound and/or an organic compound.

6. A black titanium oxynitride according to claim 1, wherein $0.001\leqq n\leqq 0.04$.

7. A process for preparing black titanium oxynitride comprising the following steps:

coating silicon oxide on one or more titanium oxide particles; and firing the titanium oxide particles in the presence of a nitrogen-containing reducing agent, wherein said black titanium oxynitride has a chemical composition represented by the formula: $TiN_xO_y \cdot nSiO_2$, wherein x represents a ratio of nitrogen atom to titanium atom, y represents a ratio of oxygen atom to titanium atom wherein $0<x<2$ and $0<y<2$.

n represents a molar ratio of $SiO_2$ to $TiN_xO_y$, wherein $0<n\leqq 0.05$,

N is present in an amount by weight $17\leqq N\leqq 23$ wt %, and said black titanium oxynitride has a specific surface area of 5-30 m$^2$/g and a crystallite diameter of 17-25 nm, measured by using an X-ray diffractometer.

* * * * *